Feb. 12, 1957  G. B. IVERSEN ET AL  2,781,132

FILTER CELL

Filed June 8, 1954

GUNNAR BOLT IVERSEN,
GUNDER GEORG ULRICH WASMUTH SWENSEN,
& GUNNAR JOHANSEN
INVENTORS

By Wendroth, Lind & Ponack
ATTORNEYS

# United States Patent Office 2,781,132
Patented Feb. 12, 1957

2,781,132

FILTER CELL

Gunnar Bolt Iversen, Gunder Georg Ulrich Wasmuth Swensen, and Gunnar Johansen, Heroya, near Porsgrunn, Norway, assignors to Norsk Hydro-Elektrisk Kvaelstofaktieselskab, Oslo, Norway Application June 8, 1954, Serial No. 435,244

Claims priority, application Norway June 13, 1953

2 Claims. (Cl. 210—154)

The invention relates to a filter cell, and more especially to a filter cell of the basket type, adapted to be used in a filter thickener.

One object of the invention is to provide a filter cell which is simple in manufacture and has a long life, at the same time being effective in use.

It is also an object of the invention to provide a filter cell which occupies little space relative to its filtering capacity, and which can easily be assembled with other filter cells of the same type to a filter aggregate.

A further object of the invention is to provide a filter cell being particularly suitable for use in the filtering of large quantities of liquid which contain relatively small amounts of solids. This is, however, no obstacle to the filter cell according to the invention being also suitable for other purposes.

Other objects and advantages of the invention will appear from the following description in conjunction with the drawings, which illustrate an embodiment of a filter cell according to the invention, without any limitation of the protection which is claimed for the invention as specified in the claims.

Figure 1:
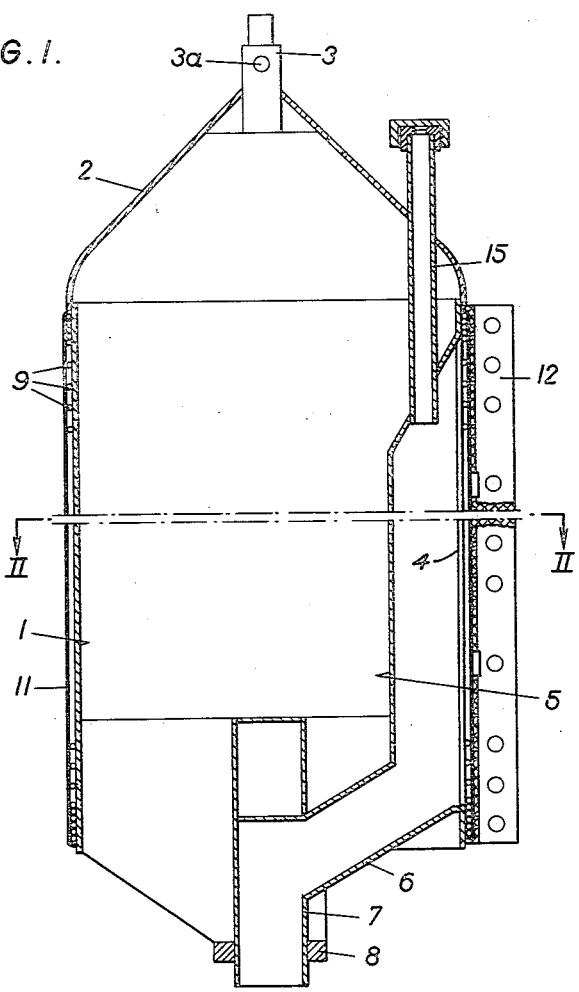
Figure 1 shows an axial section through a filter cell according to a preferred embodiment of the invention.
Figure 3:
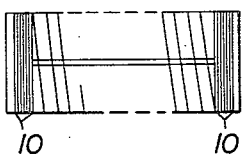
Figure 3 shows on a smaller scale and quite schematically a stage in the making a filter cell.
Figure 2:
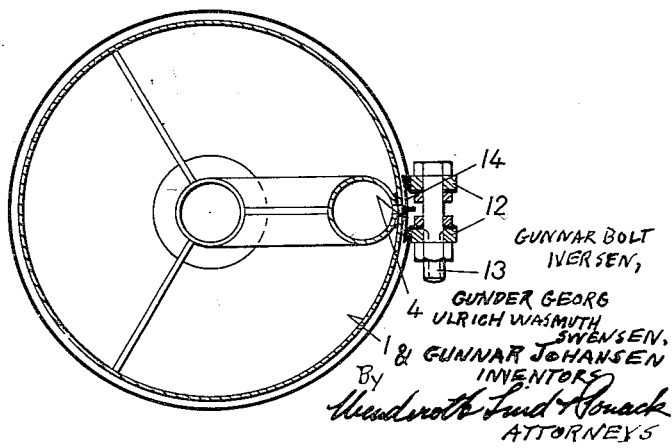
Figure 2 shows a cross-section along line II—II in Figure 1.

The filter cell according to the embodiment illustrated in the drawing comprises a drum 1, which at its upper end is terminated by a conical end-piece 2 with a stud 3 by means of which the filter cell is supported in vertical position. The stud 3 is provided with a hole 3a for lifting of the cell.

The drum wall is provided with a longitudinal slit 4. In the interior of the drum there is attached a collecting pipe 5 for the filtrate. This pipe is likewise provided with a longitudinal slit, which coincides with the slit 4, so that the space outside the drum wall is connected through the two slits to the collecting pipe 5. The pipe 5 is closed at its upper end, and is at its lower end connected by means of a pipe 6 to an outlet pipe 7 for the filtrate. The outlet pipe is provided with a flange 8 for attachment to a pipe system.

According to one essential feature of the invention a wire 9 is wound helically around the drum and a filter cloth 11 stretched around the wire coil. At the ends of the drum the turns of the wire coil are suitably close to one another, as shown at 10, whereas the other turns are wound with intermediate spaces.

In the embodiment shown in the drawing the filter cloth consisting suitably of a metal wire net, is made taut thereby that along each of two parallel legs it is fastened to a ledge 12, which ledges are, after the cloth has been laid around the drum, drawn towards each other by means of screws 13.

The space between the ledges is covered by a plate 14. 15 denotes a pipe, one end of which projects into the collecting pipe 5, and the other end projects out through the end-piece 2 and is normally kept closed. Through this pipe a washing liquid can be supplied for cleaning of pipe 5.

The filter cell functions in the following way:

The filter cell stands conveniently vertical in a container, to which the liquid which is to be filtered, is conducted. The cell rests then on flange 8, which at the same time forms a tight joint, the flange resting against a packing. The liquid makes its way through the filter cloth 11, while the liquid's content of solid particles is deposited on the cloth.

The liquid which forces its way through the filter cloth, enters the space between the turns of the wire coil 9 and passes through the slit 4 and the corresponding slit in pipe 5, into this collecting pipe, and runs thence through pipe 6 to the outlet 7.

The filter cell according to the invention has several advantages compared with known constructions. It has a large filter area compared with the weight of the material used. The production costs of the cell are relatively low. The discharge pipe 5 has a relatively small volume whereby the time required for obtaining a clear filtrate after starting the filtration period is reduced to a minimum. During the cleaning and rinsing periods only small quantities of cleaning liquid are required.

We claim:

1. A filter cell comprising a drum having an unperforated, cylindrical wall provided with a longitudinal slot extending substantially the full length of the wall, a wire wound helically on the drum wall with intermediate spaces between adjacent turns of the wire, a filter cloth stretched over said wire, and a pipe attached inside the drum wall, said pipe being provided with a longitudinal slot extending substantially the full length of the drum wall and coinciding with said slot in said wall.

2. A filter cell as claimed in claim 1 in which said wire at each end of the drum is wound without intermediate spaces between adjacent turns.

References Cited in the file of this patent

UNITED STATES PATENTS

| | | |
|---|---|---|
| 1,001,929 | Collins | Aug. 29, 1911 |
| 1,677,118 | Ford | July 10, 1928 |
| 1,913,402 | Liddell | June 13, 1933 |
| 2,100,646 | Hillier | Nov. 30, 1937 |
| 2,279,838 | Oliver | Apr. 14, 1942 |
| 2,429,321 | La Brecque | Oct. 21, 1947 |

FOREIGN PATENTS

| | | |
|---|---|---|
| 126,722 | Australia | Feb. 19, 1948 |